(12) United States Patent
Hietbrink (10) Patent No.: US 11,737,600 B2
(45) Date of Patent: Aug. 29, 2023

(54) CONFIGURABLE AIR FRYER AND METHOD OF OPERATING THE SAME

(71) Applicant: KONINKLIJKE PHILIPS N.V., Eindhoven (NL)

(72) Inventor: Ingrid Hietbrink, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/787,297

(22) PCT Filed: Dec. 18, 2020

(86) PCT No.: PCT/EP2020/087178
§ 371 (c)(1),
(2) Date: Jun. 18, 2022

(87) PCT Pub. No.: WO2021/123277
PCT Pub. Date: Jun. 24, 2021

(65) Prior Publication Data
US 2023/0015314 A1    Jan. 19, 2023

(30) Foreign Application Priority Data

Dec. 19, 2019  (EP) .................................... 19217827

(51) Int. Cl.
*A47J 39/00* (2006.01)
*A47J 37/06* (2006.01)
(Continued)

(52) U.S. Cl.
CPC .............. *A47J 37/0641* (2013.01); *A23L 5/12* (2016.08); *F24C 15/322* (2013.01); *A23V 2002/00* (2013.01)

(58) Field of Classification Search
CPC ........ A47J 37/0641; A23L 5/12; F24C 15/322
See application file for complete search history.

(56) References Cited

U.S. PATENT DOCUMENTS 2,966,576 A * 12/1960 Nowotny ............. B23K 9/0282
                                                219/60 R
4,817,509 A    4/1989 Erickson
(Continued)

FOREIGN PATENT DOCUMENTS

CN    108778074 A    11/2018
CN    109567612 A    4/2019
(Continued)

OTHER PUBLICATIONS

Extended European Search Report issued in connection with corresponding EP Application No. 19217827.5 dated Feb. 28, 2020.

*Primary Examiner* — Steven N Leff
(74) *Attorney, Agent, or Firm* — Maschoff Brennan (57) ABSTRACT

Provided is an air fryer that includes an inner cooking chamber located within a cooking chamber. The inner cooking chamber has a first opening and a second opening spaced apart from the first opening across the inner cooking chamber. The inner cooking chamber is partly delimited by a second wall extending between the first opening and the second opening. A duct is defined by a space between the first wall and the second wall. The duct provides a fluid connection between the first opening and the second opening. The air fryer also includes a heater for heating the inner cooking chamber, and a fan. The fan receives air from axial directions and moves the air radially. The fan is axially movable relative to the inner cooking chamber such that the air fryer is switchable between a first configuration and a second configuration, and vice versa.

16 Claims, 6 Drawing Sheets

(51) Int. Cl.
*A23L 5/10* (2016.01)
*F24C 15/32* (2006.01)

(56) References Cited

U.S. PATENT DOCUMENTS

| | | | | |
|---|---|---|---|---|
| 5,526,734 | A * | 6/1996 | Harrison | A47J 37/1219 |
| | | | | 219/400 |
| 5,699,722 | A * | 12/1997 | Erickson | A23L 5/17 |
| | | | | 126/39 M |
| 2012/0125313 | A1* | 5/2012 | Van Der Weij | F24C 15/322 |
| | | | | 126/21 R |
| 2014/0021191 | A1* | 1/2014 | Moon | A47J 37/0629 |
| | | | | 34/220 |
| 2015/0250187 | A1* | 9/2015 | Sakane | A21B 5/00 |
| | | | | 219/400 |
| 2016/0113442 | A1 | 4/2016 | De Haas et al. | |
| 2016/0270596 | A1* | 9/2016 | Allemand | A47J 37/1209 |
| 2017/0231426 | A1 | 8/2017 | Barford | |
| 2018/0035698 | A1 | 2/2018 | McNerney et al. | |
| 2018/0184841 | A1* | 7/2018 | Bruin-Slot | A47J 37/043 |
| 2018/0255971 | A1* | 9/2018 | Moon | A47J 37/0641 |

FOREIGN PATENT DOCUMENTS

| | | | |
|---|---|---|---|
| CN | 208941868 U | 6/2019 | |
| EP | 1447004 A2 | 8/2004 | |
| EP | 1867264 A1 | 12/2007 | |
| EP | 2848169 A1 * | 3/2015 | A47J 37/04 |
| FR | 2896677 A1 * | 8/2007 | A47J 27/004 |
| JP | S58-86329 A | 5/1983 | |
| JP | H08-089414 A | 4/1996 | |
| KR | 20170135619 A | 12/2017 | |
| WO | 2016007002 A1 | 1/2016 | |

* cited by examiner

CONFIGURABLE AIR FRYER AND METHOD OF OPERATING THE SAME

CROSS-REFERENCE TO RELATED APPLICATIONS

The present application is a U.S. National Phase application under 35 U.S.C. § 371 of International Application No. PCT/EP2020/087178, filed on Dec. 18, 2020, which claims the benefit of European Patent Application No. 19217827.5, filed on Dec. 19, 2019. These applications are hereby incorporated by reference herein.

FIELD OF THE INVENTION

This invention relates to a configurable air fryer, and a method of operating such an air fryer.

BACKGROUND OF THE INVENTION

Air fryers are common kitchen appliances. Air fryers may, for example, take the form of portable ovens which are designed to fit on a kitchen work surface.

Conventional air fryers tend to comprise an inner cooking chamber located within a cooking chamber. The inner cooking chamber may have a first opening and a second opening spaced apart from, e.g. opposing, the first opening. The inner cooking chamber may be partly delimited by a second wall extending between the first opening and the second opening. A duct is defined by a space between a first wall of the cooking chamber and the second wall. The duct may provide a fluid connection between the first opening and the second opening, which fluid connection is external to the inner cooking chamber.

The air fryer may also include a heater for heating the inner cooking chamber. The heater may heat the food received in the inner cooking chamber directly, but may also heat the air which is circulated in the air fryer by a fan.

The fan may be driven by a motor via a drive shaft. The fan may, for example, be positioned in the duct adjacent the first opening. The fan may be configured to draw air axially from the inner cooking chamber and eject the air radially into the duct. The air may then be recirculated back into the inner cooking chamber via the second opening.

In a conventional air fryer, the fan draws air from a single axial direction. The fan may comprise a cover member on one side which prevents air from axially entering the fan from that side. The open side of the fan may admit air from the inner cooking chamber via the first opening, and eject the air radially into the duct, as previously described. Thus, the design of the fan effectively contributes to the air in the air fryer flowing through the inner cooking chamber in a single predominant direction.

The single predominant direction of airflow through the inner cooking chamber may mean that the homogeneity of cooking, baking or frying of the food is compromised, since the heated air invariably passes first through a portion of the food close to the second opening before reaching the portions of the food lying further towards the first opening.

Providing improved homogeneity of cooking, baking or frying using an air fryer, whilst minimizing additional design complexity remains a challenge. In particular, it would be desirable to improve cooking, baking or frying homogeneity but with minimal impact to the physical robustness of the air fryer and its components.

SUMMARY OF THE INVENTION

The invention is defined by the claims.

According to an aspect there is provided an air fryer comprising: a cooking chamber delimited by a first wall; an inner cooking chamber within the cooking chamber, the inner cooking chamber having a first opening and a second opening spaced apart from the first opening, and a second wall extending between the first opening and the second opening; a duct defined by a space between the first wall and the second wall, the duct providing a fluid connection between the first opening and the second opening; a heater for heating the inner cooking chamber; and a fan for receiving air from axial directions and moving the air radially, wherein the fan is axially movable relative to the inner cooking chamber such that the air fryer is configurable to adopt: a first configuration in which the fan is positioned in the duct and arranged to axially receive air from the inner cooking chamber via the first opening and move the air radially towards the first wall, the cooking chamber being arranged to guide the air to the second opening via the duct; and a second configuration in which the fan is positioned in the inner cooking chamber and arranged to axially receive air from the duct via the first opening and move the air radially towards the second wall, the second wall being arranged to guide the air into the duct via the second opening.

The present invention is based on the realization that the predominant direction of airflow within the air fryer may be reversible by employing a configurable design in which the fan can be moved relative to the inner cooking chamber (and vice versa). In particular, in the first configuration, the fan is located within the duct, and air received from the inner cooking chamber via the first opening is directed by the fan radially towards the first wall. The first wall may then guide the air in the duct to the second opening, whereupon the air re-enters the inner cooking chamber.

Upon axial movement of the fan relative to the inner cooking chamber, the fan is located within the inner cooking chamber in the second configuration. Air received from the inner cooking chamber via the first opening is thus directed by the fan radially towards the second wall of the inner cooking chamber. The second wall guides the air to and through the second opening, whereupon the air flows through the duct and re-enters the inner cooking chamber via the first opening. This means that upon switching from the first configuration to the second configuration, the predominant direction of airflow in the inner cooking chamber reverses. The capability to reverse the predominant airflow direction in this relatively straightforward manner may assist with cooking. For example, reversing the direction of airflow by moving the fan relative to the inner cooking chamber during the cooking process may result in more homogeneous cooking, baking or frying of food.

The air fryer may comprise a shielding member arranged to block air from axially entering the fan in the direction of the first opening from the inner cooking chamber in the second configuration. The fan is arranged to axially receive air from the inner cooking chamber via the first opening in the first configuration, as previously described. Accordingly, the shielding member may not block air from axially entering the fan from the inner cooking chamber via the first opening in the first configuration.

The shielding member may assist in switching the direction of airflow when the second configuration is selected, since the shielding member may assist to minimize or prevent air being axially drawn into the fan from the inner cooking chamber. Whilst alternative ways of facilitating the airflow direction switch are conceivable, such as by configuring the fan, e.g. the fan blades, to preferentially draw air axially from the duct via the first opening (rather than from the inner cooking chamber) when adopting the second configuration, the shielding member provides an advantageously simple and inexpensive way of assisting the airflow direction switch.

The fan may be arranged relative to the first wall in the first configuration such that the first wall blocks air from axially entering the fan in the direction of the first opening from the duct. This may assist in promoting the desired airflow in the first configuration, since the proximity between the fan and the first wall in this configuration may assist to minimize or prevent that air is axially drawn into the fan in the direction of the first opening from the duct. The portion of the first wall which blocks axial air passage into the fan in this example may, for example, be integral to the rest of the first wall or else may be included in a further shielding member which is mounted in the duct.

The inner cooking chamber may be axially expandable without changing the axial position of the fan, the axial expansion of the inner cooking chamber causing the air fryer to change from the first configuration to the second configuration. Expansion of the inner cooking chamber may provide a relatively straightforward way of selecting the first or second configuration, which may not necessitate adjustment of the fan, and its associated elements, e.g. the motor and drive shaft.

When the air fryer includes the shielding member, the shielding member may be moved upon axial expansion of the inner cooking chamber, thereby to block air from axially entering the fan in the direction of the first opening from the inner cooking chamber in the second configuration. The shielding member may be spaced from the fan, and may thus not block the fan, when the inner cooking chamber is not axially expanded in the first configuration.

The second wall of the inner cooking chamber may, for example, comprise a pair of wall sections which at least partially overlap with each other when the air fryer is in the first configuration. The wall sections may be axially slidable relative to each other such as to permit the axial expansion of the inner cooking chamber. Slidable wall sections may represent a relatively simple way of axially expanding the inner cooking chamber such as to permit the second configuration to be adopted. The first configuration may also be straightforward to adopt by collapsing the (expanded) inner cooking chamber by sliding the wall sections such that the overlap between them is restored.

In an embodiment, at least one of the wall sections comprises a heat reflector. The heat reflector may, for instance, be arranged to guide the air into the duct via the second opening in the second configuration. The heat reflector may advantageously serve the dual purpose of reflecting heat back towards the inner cooking chamber, e.g. a central portion of the inner cooking chamber, and guiding air towards the second opening when the air fryer adopts the second configuration.

In an embodiment, the cooking chamber may be arranged to axially expand with the expansion of the inner cooking chamber. By the cooking chamber expanding with, e.g. to the same axial extent, as the inner cooking chamber upon adopting the second configuration, the axial dimension of the duct adjacent the first opening may be advantageously maintained during configuring of the air fryer.

The first wall may, for example, comprise a pair of cooking chamber parts. The cooking chamber parts may be at least partially overlapping with each other when the cooking chamber is not expanded, and may be axially slidable relative to each other such as to permit the axial expansion of the cooking chamber. Slidable cooking chamber parts may represent a relatively simple way of axially expanding the cooking chamber during adoption of the second configuration. The first configuration may also be straightforward to adopt by collapsing the cooking chamber (together with the inner cooking chamber) by sliding the cooking chamber parts such that they overlap with each other.

In an embodiment, at least one of said cooking chamber parts comprises a heat shield. The heat shield may, for example, be arranged to guide the air to the second opening via the duct in the first configuration. The heat shield may advantageously serve the dual purpose of protecting other components, e.g. electronic components, of the air fryer from the heat inside the inner cooking chamber and duct, and guiding air in the duct from the first opening towards the second opening when the air fryer adopts the first configuration.

The pair of cooking chamber parts may comprise a first cooking chamber part, and the pair of wall sections may comprise a first wall section, wherein the first cooking chamber part is coupled to the first wall section such that sliding of the first cooking chamber part, together with the first wall section, axially expands the inner cooking chamber and the cooking chamber. Coupling of the first cooking chamber part and the first wall section in this manner may facilitate configuring of the air fryer from the first configuration to the second configuration and vice versa.

In an embodiment, the first wall comprises a third cooking chamber part, and the second wall comprises a third wall section. The third cooking chamber part and the third wall section may define a drawer which is laterally slidable relative to the pair of cooking chamber parts, and the pair of wall sections. The lateral sliding of the drawer may be perpendicular to the axial direction. The drawer may, for example, permit food to be placed into or removed from the third wall section. The drawer may further permit facile cleaning of the third cooking chamber part and the third wall section. The third wall section may, for example, comprise a food support area, such as a perforate wall whose apertures may (at least partly) define the second opening.

The air fryer may comprise a housing in which the cooking chamber is received. In such an embodiment, the above-described drawer (when such a drawer is included in the air fryer) may be slidable into and out of the housing.

In an embodiment, the fan is telescopically mounted such as to permit axial movement of the fan independently of the inner cooking chamber, thereby to permit adoption of the first and second configurations. Axial movement of the telescopically mounted fan whilst the inner cooking chamber (and cooking chamber) remains in a fixed position may assist in terms of permitting configuring of the air fryer in a relatively simple manner, which may also avoid changing an axial, e.g. height, dimension of the inner cooking chamber or cooking chamber.

When the air fryer includes the shielding member, the axial position of the shielding member may be fixed. Upon axial extension of the fan in the second configuration, the fan may be blocked by the shielding member so as to limit or prevent air from axially entering the fan in the direction of the first opening from the inner cooking chamber in the second configuration. When the fan is retracted in the first configuration, the shielding member may be spaced from the fan, and may thus not block the fan.

The first wall may comprise a curved inner surface, and wherein, in the first configuration, the fan may be arranged to move the air radially towards the curved inner surface, thereby to guide the air to the second opening via the duct. The curved inner surface of the first wall may thus assist with guiding the airflow in the duct towards the second opening in the first configuration.

The second wall may comprise a further curved inner surface, and wherein, in the second configuration, the fan may be arranged to move the air radially towards the further curved inner surface, thereby to guide the air into the duct via the second opening. The further curved inner surface of the second wall may assist with guiding the airflow in the inner cooking chamber towards the second opening in the second configuration.

In an embodiment, the air fryer comprises an air guide member in the duct, the air guide member being configured to guide air from the duct into the second opening in the first configuration. The air guide member may also, for example, be configured to guide air from the second opening into the duct in the second configuration.

The inner cooking chamber may, for example, comprise a perforate wall, the second opening being defined by apertures of the perforate wall. The perforate wall may provide a stable support on which food may be supported in the inner cooking chamber. The perforate wall may nevertheless permit air to flow in either direction, according to which of the first and second configurations are selected, via the apertures in the perforate wall. The perforate wall may, for example, comprise a grille or mesh, such that the apertures correspond to the spaces between the wires, rods, and/or strips defining the grille or mesh. Alternatively or additionally, the perforate wall may comprise a plate which delimits a plurality of holes. In this case, the apertures comprise the holes provided in the plate.

The air fryer may, for instance, include a food support member for supporting food, such as a cake or pizza, within the inner cooking chamber. The food support member may, for example, comprise a grill grate which can be slidably received within the inner cooking chamber. More generally, the food support member may be removable from the inner cooking chamber, such that the food support member may be regarded as an accessory for the air fryer. The food support member and the air fryer may be, for example, supplied as a kit of parts with the food support member provided separately from the air fryer which can subsequently be placed within the inner cooking chamber according to the type of food being prepared by the user of the air fryer.

According to another aspect there is provided a method of operating an air fryer, the air fryer comprising: a cooking chamber delimited by a first wall; an inner cooking chamber within the cooking chamber, the inner cooking chamber having a first opening and a second opening spaced apart from the first opening, and a second wall extending between the first opening and the second opening; a duct defined by a space between the first wall and the second wall, the duct providing a fluid connection between the first opening and the second opening; a heater for heating the inner cooking chamber; and a fan for receiving air from axial directions and moving the air radially, wherein the method comprises: axially moving the fan relative to the inner cooking chamber between: a first configuration in which the fan is positioned in the duct and axially receives air from the inner cooking chamber via the first opening and moves the air radially towards the first wall, the first wall guiding the air to the second opening via the duct; and a second configuration in which the fan is positioned in the inner cooking chamber and axially receives air from the duct via the first opening and moves the air radially towards the second wall, the second wall guiding the air into the duct via the second opening.

In an embodiment, the method further comprises: cooking a foodstuff received in said inner cooking chamber in the first configuration; and cooking the foodstuff in the second configuration. By changing from the first configuration to the second configuration (and vice versa) during cooking, more homogeneous cooking, baking or frying may be achieved relative to, for example, cooking using a single air fryer configuration or airflow direction. Moreover, moving the fan relative to the inner cooking chamber may mean that changing the airflow direction is implemented in a relatively straightforward manner.

BRIEF DESCRIPTION OF THE DRAWINGS

Examples of the invention will now be described in detail with reference to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is an air fryer comprising an inner cooking chamber located within a cooking chamber. The cooking chamber is delimited by a first wall. The inner cooking chamber has a first opening and a second opening spaced apart from the first opening across the inner cooking chamber. The inner cooking chamber is partly delimited by a second wall extending between the first opening and the second opening. A duct is defined by a space between the first wall and the second wall. The duct provides a fluid connection between the first opening and the second opening, which fluid connection is external to the inner cooking chamber. The air fryer also includes a heater for heating the inner cooking chamber, and a fan. The fan receives air from axial directions and moves the air radially. The fan is axially movable relative to the inner cooking chamber such that the air fryer is switchable between a first configuration and a second configuration, and vice versa. In the first configuration, the fan is positioned in the duct and arranged to axially receive air from the inner cooking chamber via the first opening and move the air radially towards the first wall. In the first configuration, the air ejected radially by the fan is guided to the second opening via the duct. In the second configuration, the fan is positioned in the inner cooking chamber and arranged to axially receive air from the duct via the first opening and move the air radially towards the second wall. In the second configuration, the air is guided into the duct via the second opening. Thus, the direction of airflow is reversed upon switching from the first configuration to the second configuration, and vice versa. Further provided is a method for operating the air fryer.

The present invention is based on the realization that the predominant direction of airflow within the air fryer may be reversible by employing a configurable design in which the fan can be moved relative to the inner cooking chamber (and vice versa). In particular, in the first configuration, the fan is located within the duct, and air received from the inner cooking chamber via the first opening is directed by the fan radially towards the first wall of the cooking chamber. The air ejected by the fan may then be guided to the second opening via the duct, whereupon the air re-enters the inner cooking chamber.

Upon axial movement of the fan relative to the inner cooking chamber, the fan is located within the inner cooking chamber in the second configuration. Air received from the inner cooking chamber via the first opening is thus directed by the fan radially towards the second wall of the inner cooking chamber. The air ejected by the fan may then be guided to and through the second opening, whereupon the air flows through the duct and re-enters the inner cooking chamber via the first opening.

This means that upon switching from the first configuration to the second configuration (and vice versa), the predominant direction of airflow in the inner cooking chamber reverses. The capability to reverse the predominant airflow direction in this relatively straightforward manner may assist with cooking. For example, reversing the direction of airflow by moving the fan relative to the inner cooking chamber during the cooking process may result in more homogeneous cooking, baking or frying of food.

Figure 1A:
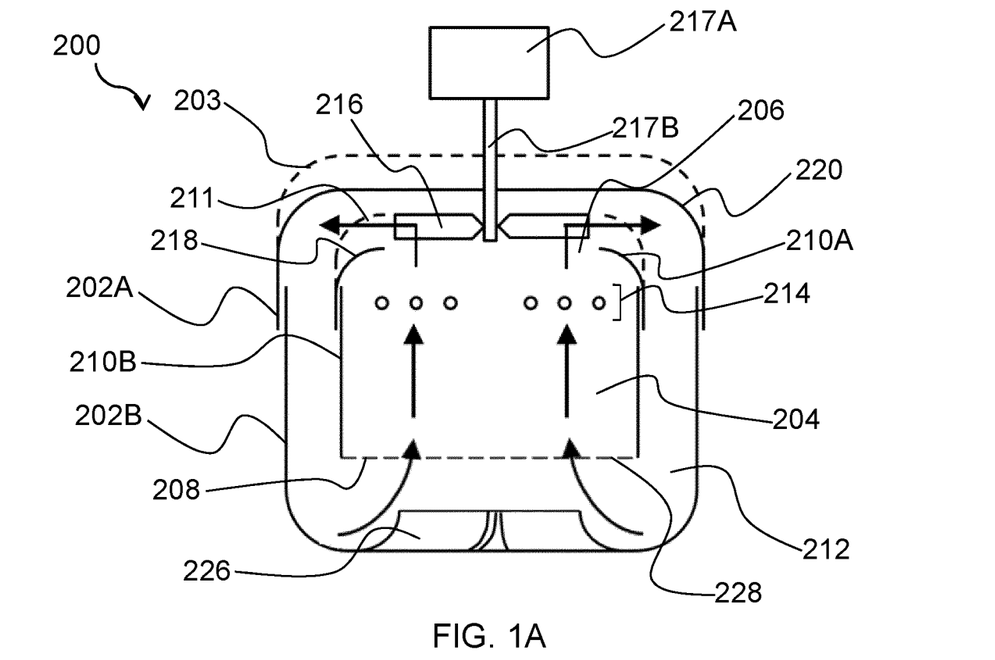
FIG. 1A schematically depicts a cross-section of an air fryer according to an example in a first configuration.

FIG. 1A schematically depicts a cross-section of an air fryer 200 according to an example. The air fryer 200 comprises an inner cooking chamber 204 located within a cooking chamber defined by a first wall 202A, 202B. The inner cooking chamber 204 has a first opening 206 and a second opening 208 opposing the first opening 206. The inner cooking chamber 204 is partly delimited by a second wall 210A, 210B.

Figure 1B:
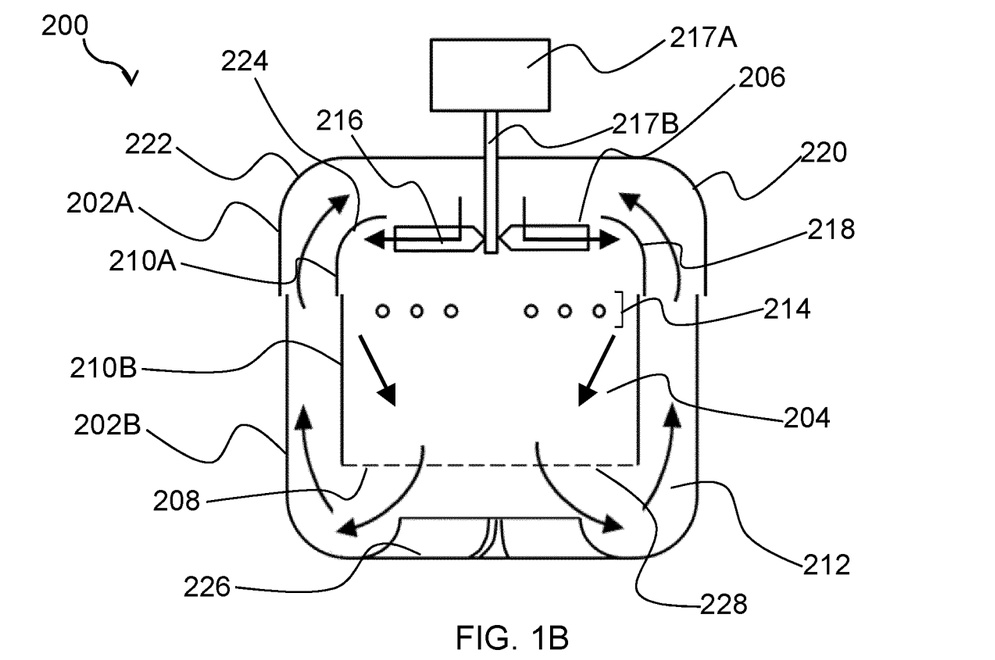
FIG. 1B schematically depicts the air fryer shown in FIG. 1A in a second configuration.

Whilst the second opening 208 opposes the first opening 206 in the example shown in FIGS. 1A and 1B, this is not intended to be limiting. The second opening 208 may alternatively or additionally be located on the side of the inner cooking chamber 204 proximal to the bottom of the inner cooking chamber 204. The close proximity of the second opening 208 to a portion of the food located in the inner cooking chamber 204 may ensure that the respective portion is cooked (rather than being bypassed) by the air drawn into the inner cooking chamber 204 via the second opening 208, as shown in FIG. 1A.

The second wall 210A, 210B may comprise, or define, a heat reflector 218 for reflecting heat back towards the food (not shown) contained within the inner cooking chamber 204 during cooking. The heat reflector 218 may be formed of any suitable material, such as a metal or metal alloy, e.g. steel. The heat reflector 218 is preferably formed from galvanized plate metal.

The first wall 202A, 202B may comprise, or define, a heat shield 220. The heat shield 220 may assist to prevent the heat within and surrounding the inner cooking chamber 204 from reaching external surfaces of the air fryer 200 and/or damaging electronic components (not shown) of the air fryer 200 external to the cooking chamber. The heat shield may, for example, comprise a metal plate or a plurality of metal plates. The metal plate(s) may be formed from any suitable metal or metal alloy, e.g. steel. The heat shield 220 is preferably formed from one or a plurality of, e.g. two, metal plates each formed from galvanized plate metal.

The second air opening 208 may, in a non-limiting example, be at least partly defined by the apertures of a perforate wall 228. The perforate wall 228 may define a platform on which food for cooking/baking/frying may be placed. The inner cooking chamber 204 may, for example, be regarded as a basket having a bottom portion corresponding to the perforate wall 228, and sidewalls corresponding to the second wall 210A, 210B, or at least a (second) wall section 210B thereof.

The perforate wall 228 may, for example, comprise a grille or mesh, such that the apertures correspond to the spaces between the wires, rods, and/or strips defining the grille or mesh. Alternatively or additionally, the perforate wall 228 may comprise a plate which delimits a plurality of holes. In this case, the apertures comprise the holes provided in the plate.

The cooking chamber and the inner cooking chamber 204 may be openable, for example by a drawer (not shown in FIGS. 1A and 1B), in order that food and/or at least part of the inner cooking chamber 204 may be placed into and removed from the air fryer 200. A non-limiting example of such an openable cooking chamber and inner cooking chamber 204 will be described in more detail herein below with reference to FIGS. 5A, 5B, 6A, and 6B.

As shown in FIG. 1A, the second wall 210A, 210B extends between the first opening 206 and the second opening 208. A duct 212 is defined by a space between the first wall 202 and the second wall 210. The duct 212 provides a fluid connection between the first opening 206 and the second opening 208.

The air fryer 200 may further comprise a housing (not shown in the Figures for the sake of clarity of representation). The housing may, for example, encompass the cooking chamber and other components, e.g. electronic components, of the air fryer 200. The housing may, for instance, be dimensioned to accommodate axial expansion of the inner cooking chamber 204 (and the cooking chamber), which will be described in more detail herein below. Suitable housing designs are well-known per se, and will not be further described herein for the sake of brevity only.

The air fryer 200 also includes a heater 214 for heating the inner cooking chamber 204. In the non-limiting example shown in FIGS. 1A and 1B, the heater 214 is mounted within the inner cooking chamber 204. The heater 214 may heat the food (not shown) received in the inner cooking chamber 204 directly, but may also heat the air which is circulated in the air fryer 200 by the fan 216. The heater 214 may thus be arranged to permit the air circulating in the air fryer 200 to pass through it, thereby to transfer heat to the circulating air. In other examples, the heater 214 may be mounted outside the inner cooking chamber 204, e.g. within the duct 212.

The heater 214 may comprise any suitable heating element 214. The heater 214 may, for example, comprise a resistive heating element, e.g. a spiral heating element. Such a spiral heating element 214 is shown in the example depicted in FIG. 1A: the six spatially separated circles across the inner cooking chamber 204 representing the cross-section of the spiral heating element. In the case of a spiral heating element, the circulating air may pass through gaps between coils of the heating element. Such air fryer heaters 214 are well-known per se, and will not be further described herein for the sake of brevity only.

As shown in FIG. 1A, the fan 216 is driven by a motor 217A via a drive shaft 217B. The fan 216 draws air from axial directions and ejects the air radially, as will be described in greater detail herein below with reference to FIGS. 3 and 4.

The fan 216 is preferably configured to rotate in a single direction. In other words, the motor 217A may be configured to drive rotation of the fan 216 only in a single direction. A fan 216 which enables airflow between the first opening 206 and the second opening 208 in both directions by being driven by a motor 217A whose direction of rotation is reversible may be disadvantageously costly, and such motors 217A may be more likely to fail during use. Such motor failure may necessitate repair and/or discarding of the motor 217A, or even the entire air fryer 200, which would contribute to pollution. Accordingly, the fan 216 being configured to rotate in only one direction may assist to ensure simple and reliable operation of the fan 216 and the motor 217A.

Moreover, the air fryer 200 according to the present disclosure may permit the direction of airflow to be reversed without the requirement for driving the fan 216 in opposite directions, as will be explained in more detail herein below.

FIG. 1A shows the air fryer 200 in a first configuration in which the fan 216 is positioned in the duct 212. The fan 216 axially draws air from the inner cooking chamber 204 through the first opening 206 and into the duct 212. The air then re-enters the inner cooking chamber 204 via the second opening 208 and is drawn through the food (not shown) contained therein, past the heater 214, and back into fan 216 via the first opening 206, as represented by the arrows in FIG. 1A.

As shown in FIG. 1A, the heat shield 220 assists to guide the air radially ejected into the duct 212 towards the second opening 208 in the first configuration. To this end, the heat shield 220 may comprise a curved inner surface 222 which aligns with the radial air outlets of the fan 216 in the first configuration, and guides the radially ejected air from the fan 216 around the duct 212 towards the second opening 208. The curved inner surface 222 may assist in terms of providing smoother airflow around the duct 212.

The heat shield 220 may thus advantageously serve the dual purpose of protecting other components, e.g. electronic components, motor etc., of the air fryer 200 from the heat inside the inner cooking chamber 204 and the duct 212, and assisting to guide air in the duct 212 towards the second opening 208 when the first configuration is selected.

FIG. 1B shows the air fryer 200 of FIG. 1A in a second configuration in which the fan 216 is positioned in the inner cooking chamber 204. The airflow in this second configuration is reversed relative to that in the first configuration, as represented by the arrows in FIG. 1B. The fan 216 axially draws air from the duct 212 into the inner cooking chamber 204 via the first opening 206. The fan 216 radially ejects the air towards the second wall 210, which may guide the air to and through the second opening 208 and into the duct 212. The air then re-enters the inner cooking chamber 204 via the first opening 206, and is axially drawn back into the fan 216. Thus, the airflow in the air fryer 200 is reversed upon switching between the respective configurations shown in FIGS. 1A and 1B.

As shown in FIG. 1B, the heat reflector 218 assists to guide the air into the duct 212 via the second opening 208 in the second configuration. To this end, the heat reflector 218 may comprise a further curved inner surface 224 which aligns with the radial air outlets of the fan 216 in the second configuration, and guides the radially ejected air in the inner cooking chamber 204 towards the second opening 208. The curved further inner surface 224 may assist in terms of providing smoother airflow within the inner cooking chamber 204.

The heat reflector 218 may thus advantageously serve the dual purpose of reflecting heat back towards the inner cooking chamber 204, e.g. towards a central portion of the inner cooking chamber 204, and guiding air in the inner cooking chamber 204 towards the second opening 208 when the second configuration is selected.

In an embodiment, the air fryer 200 comprises an air guide member 226 in the duct 212. The air guide member 226 may assist to guide air from the duct 212 towards and through the second opening 208 in the first configuration. Alternatively or additionally, the air guide member 226 may assist to guide air from the inner cooking chamber 204 into the duct 212 via the second opening 208 in the second configuration. The air guide member 226 is preferably mounted in the duct 212 opposite the second opening 208.

Any suitable design may be contemplated for the air guide member 226. The air guide member 226 may, for example, comprise a so-called star-fish shape. The star-fish shape comprises a plurality of radial fins which are shaped to guide air in the duct 212 towards and through the second opening 208 in the first configuration. The radial fins may also assist to guide air passing through the second opening 208 into the duct 212 in the second configuration. In a non-limiting example, the radial fins may be curved in order to spin the airflow entering the inner cooking chamber 204 via the second opening 208.

In general terms, the air fryer 200 may be switched from the first configuration to the second configuration, and vice versa, by axial movement of the fan 216 relative to the inner cooking chamber 204. This relative axial movement permits the fan 216 to be positioned in the duct 212 in the first configuration, and within the inner cooking chamber 204 in the second configuration. Such relative axial movement may be implemented in any suitable manner.

In the non-limiting example shown in FIGS. 1A and 1B, the inner cooking chamber 204 is axially expandable without changing the axial position of the fan 216. Thus, the expansion of the inner cooking chamber 204 may result in the position of the fan 216 switching from being within the duct 212 in FIG. 1A to being within the axially expanded inner cooking chamber 204 in FIG. 1B. Expansion of the inner cooking chamber 204 in this manner may provide a relatively straightforward way of selecting the first or second configuration, which may not necessitate adjustment of the fan 216, and its associated elements, e.g. the motor 217A and drive shaft 217B.

In the particular example shown in FIGS. 1A and 1B, the second wall 210A, 210B comprises a first wall section 210A and a second wall section 210B. The first wall section 210A at least partially overlaps with the second wall section 210B when the inner cooking chamber 204 is in the unexpanded state corresponding to the first configuration shown in FIG. 1A. The hashed line 211 in FIG. 1A represents the degree to which the first wall section 210A may move, e.g. slide, relative to the second wall section 210B in order to enable the air fryer 200 to switch from the first configuration to the second configuration.

The axially slidable wall sections 210A, 210B in the example shown in FIGS. 1A and 1B may provide a relatively simple way of axially expanding the inner cooking chamber 204 such as to permit the air fryer 200 to switch between the respective configurations. A suitable releasable catch (not visible) may, for example, be employed to temporarily fix the inner cooking chamber 204 in the axially expanded state shown in FIG. 1B. The releasable catch may prevent that the inner cooking chamber 204 collapses back to the first configuration shown in FIG. 1A when such collapsing is not desired or intended by the user of the air fryer 200. When switching from the second configuration to the first configuration is intended by the user, the catch may be released in order to permit the first wall section 210A to slide back and overlap with the second wall section 210B, as shown in FIG. 1A.

The air fryer 200 may alternatively or additionally include a further releasable catch or mechanical stop (not visible) for temporarily securing the air fryer 200 in the first configuration. Release of the further releasable catch may permit the first wall section 210A to slide relative to the second wall section 210B in order to enable axial expansion of the inner cooking chamber 204.

In the non-limiting example shown in FIGS. 1A and 1B, the cooking chamber axially expands together with the inner cooking chamber 204. By the cooking chamber expanding with, e.g. to the same axial extent, as the inner cooking chamber 204 upon adopting the second configuration, the axial dimension, in other words depth, of the duct 212 adjacent the first opening 206 may be advantageously maintained during configuring of the air fryer 200.

Such axial expansion of the cooking chamber may, for example, be implemented by the first wall 202A, 202B comprising a first cooking chamber part 202A and a second cooking chamber part 202B. The hashed line 203 in FIG. 1A represents the degree to which the first cooking chamber part 202A may move, e.g. slide, relative to the second cooking chamber part 202B in order to enable the air fryer 200 to switch from the first configuration to the second configuration.

The axially slidable cooking chamber parts 202A, 202B in the example shown in FIGS. 1A and 1B may provide a relatively simple way of axially expanding the cooking chamber together with the inner cooking chamber 204 such as to permit the air fryer 200 to switch between the respective configurations.

The inner cooking chamber 204, and optionally also the cooking chamber, may be axially expandable by, for example, 3 to 10 cm, such as about 5 cm. Such an expansion distance may assist to ensure that the fan 216 is movable between the duct 212 and the inner cooking chamber 204, whilst avoiding too significant a change in form factor of the inner cooking chamber 204 or the cooking chamber.

The first cooking chamber part 202A may, for example, be coupled to the first wall section 210A. In such an example, the second cooking chamber part 202B may also be coupled to the second wall section 210B. This may mean that sliding of the first cooking chamber part 202A, together with the first wall section 210A, axially expands both the inner cooking chamber 204 and the cooking chamber. Coupling of the cooking chamber parts 202A, 202B to the respective wall sections 210A, 210B in this manner may facilitate switching between the respective configurations.

Such coupling may also mean that a common releasable catch (not visible) may be employed for temporarily fixing the air fryer 200 in the second configuration. A further common releasable catch or mechanical stop (not visible) may also be used for temporarily securing the air fryer 200 in the first configuration.

It is noted at this point that whilst FIGS. 1A and 1B show an air fryer 200 orientated such that the air circulates in vertical directions through the inner cooking chamber 204, this is not intended to be limiting. It is equally conceivable that the fan 216 be placed at the sides or back of the air fryer 200 when the air fryer 200 is orientated for use, such that the air circulates horizontally through the inner cooking chamber 204.

An advantage of the air fryer 200 being configured such that the air circulates in vertical directions through the inner cooking chamber 204, with the second opening 208 being the lower opening when the air fryer 200 is orientated for use, is that the second configuration in which air is guided towards the second opening 208 may assist in preventing that lightweight foodstuffs, such as popcorn or salami slices, are blown around the inner cooking chamber 204. The second configuration may thus be selected in preference to the first configuration when such lightweight foodstuffs are to be prepared, since in the first configuration, the upward airflow in the inner cooking chamber 204 from the second opening 208 to the first opening 206 may be more likely to cause such lightweight foodstuffs to be blown around.

Whilst the axially expanding inner cooking chamber 204 shown in FIGS. 1A and 1B may represent a particularly convenient way of selecting the first and second configurations, this is not intended to be limiting. Alternative designs which enable axial movement of the fan 216 relative to the inner cooking chamber 204 are also conceivable.

Figure 2A:
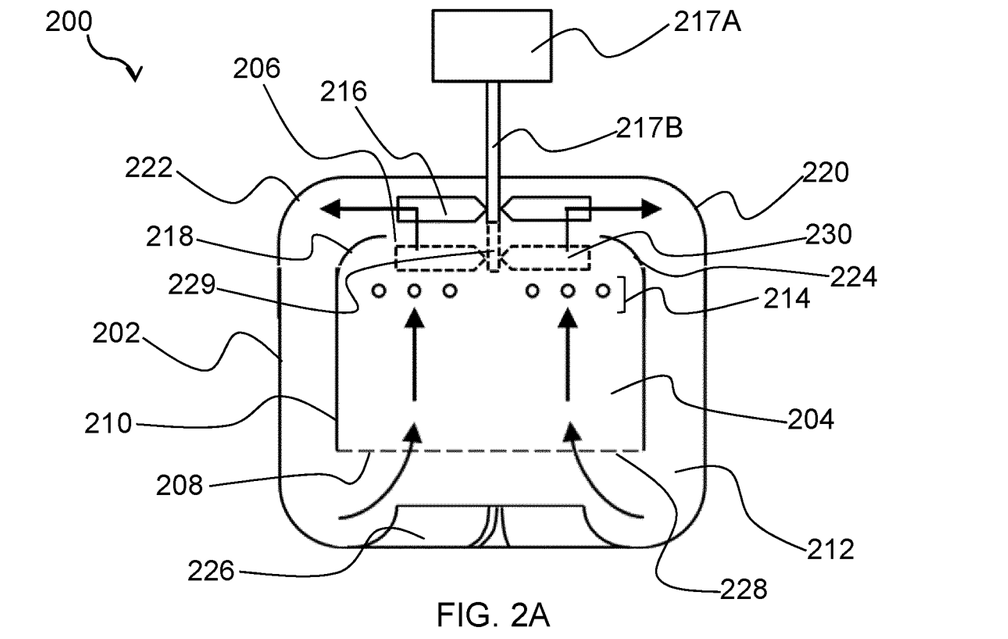
FIG. 2A schematically depicts a cross-section of an air fryer according to another example in a first configuration.
Figure 2B:
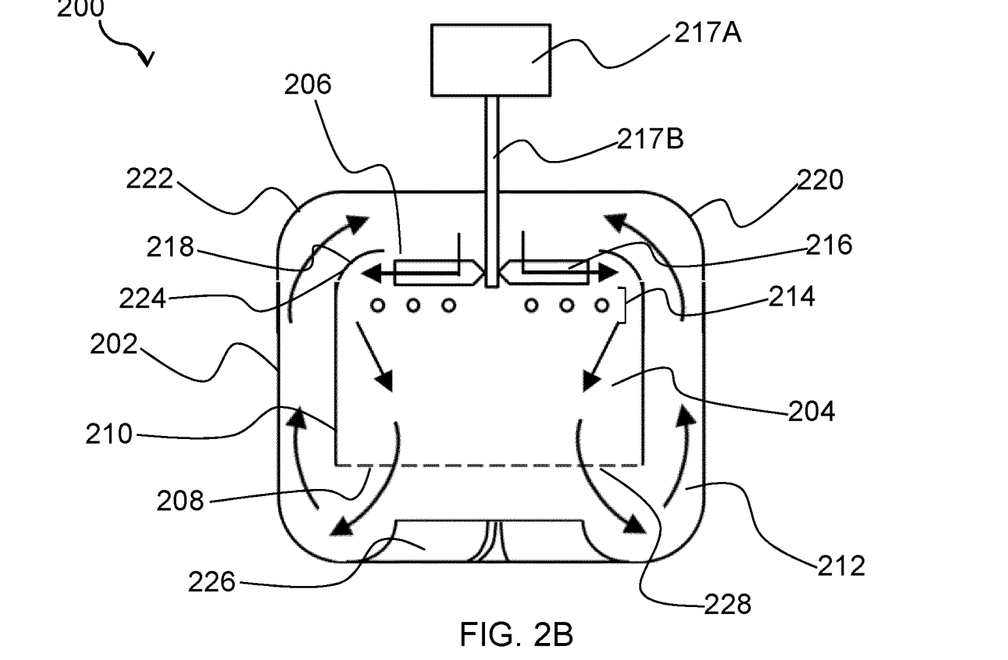
FIG. 2B schematically depicts the air fryer shown in FIG. 2A in a second configuration.

FIGS. 2A and 2B schematically depict cross-sections of an air fryer 200 according to another example. FIG. 2A shows the air fryer 200 in the first configuration in which the fan 216 is positioned in the duct 212. The arrows in FIG. 2A show the direction of airflow in the first configuration: air is axially drawn from the inner cooking chamber 204 into the fan 216 via the first opening 206, and the air which is radially ejected from the fan 216 flows around the duct 212 and re-enters the inner cooking chamber 204 via the second opening 208.

The above description of the air fryer 200 shown in FIGS. 1A and 1B is applicable to the air fryer 200 shown in FIGS. 2A and 2B, except that in the latter the fan 216 is telescopically mounted, e.g. on the cooking chamber or on a housing (not shown) surrounding the cooking chamber. This telescopic mounting enables axial movement of the fan 216 independently of the inner cooking chamber 204, thereby to permit adoption of the first and second configurations. Such axial movement of the telescopically mounted fan 216, whilst the inner cooking chamber 204 (and the cooking chamber) remain in a fixed axial position may permit selection of the first or second configuration without changing an axial, e.g. height, dimension of the inner cooking chamber 204 or the cooking chamber.

In the example shown in FIG. 2A, the hashed rectangular portion 229 represents the extent to which the drive shaft 217B may be telescopically extended, and the hashed fan-shaped portion 230 denotes the position of the fan 216 in the second configuration.

Upon axial extension of the fan 216 into the inner cooking chamber 204, as shown in FIG. 2B, the fan 216 axially draws air from the duct 212 into the inner cooking chamber 204 via the first opening 206, and radially ejects the air towards the second wall 210, which may guide the air to and through the second opening 208 and into the duct 212. The air then re-enters the inner cooking chamber 204 via the first opening 206, and is axially drawn back into the fan 216. This predominant airflow is shown by the arrows in FIG. 2B. Accordingly, telescopic mounting of the fan 216 assists to reverse the predominant air flow direction upon switching between the respective configurations of the air fryer 200.

Figure 3:
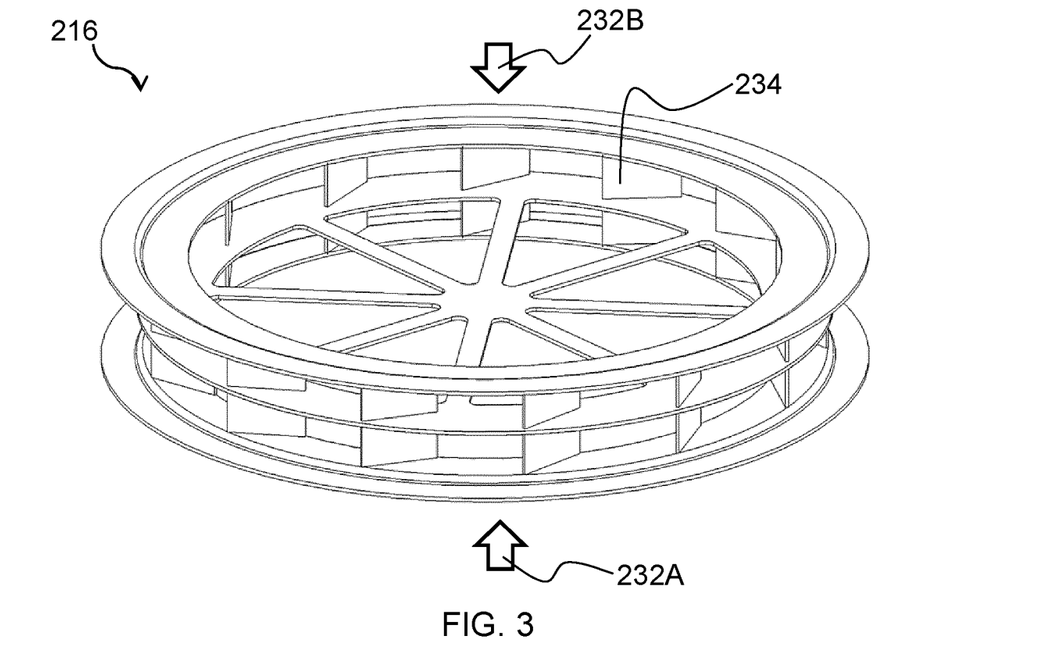
FIG. 3 shows a perspective view of a fan according to an example.

FIG. 3 shows a perspective view of an exemplary fan 216 which may be employed in the air fryer 200 according to the present disclosure. In contrast to the fans which may be employed in conventional air fryers, the fan 216 shown in FIG. 3, is open on both sides, such that air may be drawn into the fan 216 from both axial directions, denoted by the arrows 232A and 232B.

Figure 4:
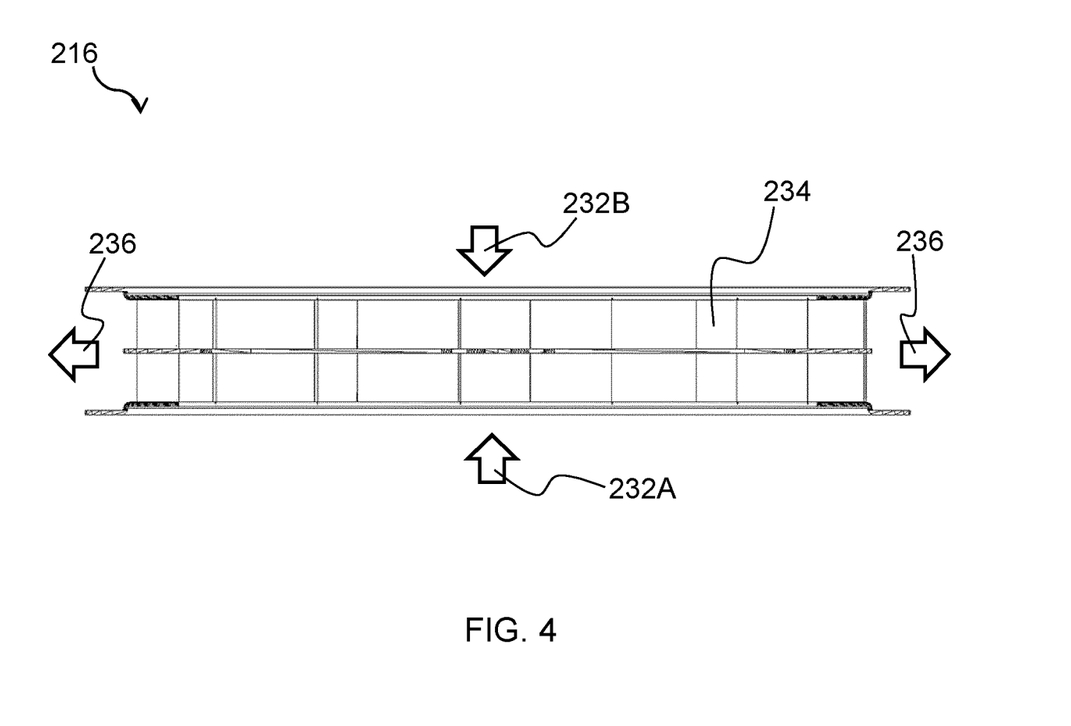
FIG. 4 shows a side-on view of the fan shown in FIG. 3.

FIG. 4 shows a side-on view of the exemplary fan 216 shown in FIG. 3, the fan blades 234 of the fan 216 may be arranged to deflect the air radially, as represented by the arrows 236.

The fan 216 may, for example, be configured such that there is substantially no bias towards or preference for drawing the air in one of the axial directions 232A, 232B with respect to the other axial direction 232B, 232A. In such an example, the air fryer 200 may be adapted, accounting for such a fan 216 design, to facilitate the airflow direction reversal upon switching between the respective configurations, as will be explained further herein below with reference to FIGS. 5A, 5B, 6A and 6B.

In an alternative non-limiting example, the first opening 206 is an upper opening and the second opening 208 is a lower opening when the air fryer 200 is orientated for use, and the fan 216 is configured to preferentially pull air in the duct 212 downwards through the first opening 206. By configuring the fan 216, e.g. the fan blades 234, in this manner, the airflow direction in the second configuration may be advantageously promoted. In spite of this airflow preference disfavoring the direction of airflow in the first configuration, the latter may be assisted by the upwards direction of convection currents. The fan 216 in this example may thus be configured such that the preference to pull air from the duct 212 downward through the first opening 208 is insufficient to counteract the upward flow of heated air in the inner cooking chamber 204 towards the first opening in the first configuration.

In a further non-limiting example, the fan 216 may be configurable to facilitate the airflow in the different directions of the first and second configurations. The fan blades 234 may, for example, be tiltable such as to favor axial drawing of air from the inner cooking chamber 204 into the duct 212 via the first opening 206 in the first configuration, and to favor axial drawing of air from the duct 212 into the inner cooking chamber 204 via the first opening 206 in the second configuration.

Figure 5A:
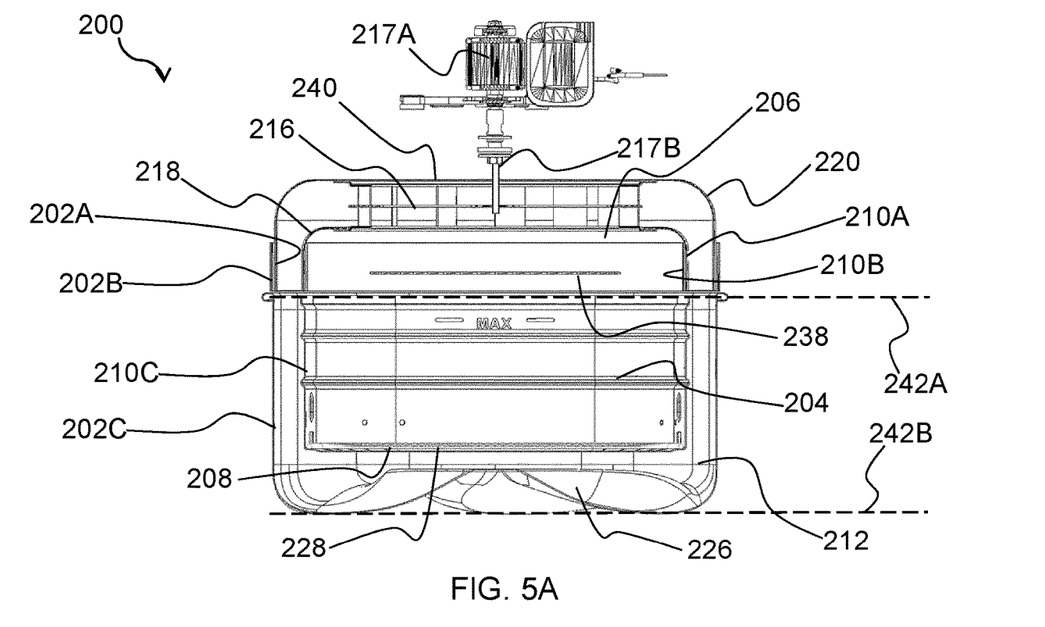
FIG. 5A shows a cut-away view of an air fryer according to yet another example in a first configuration.
Figure 5B:
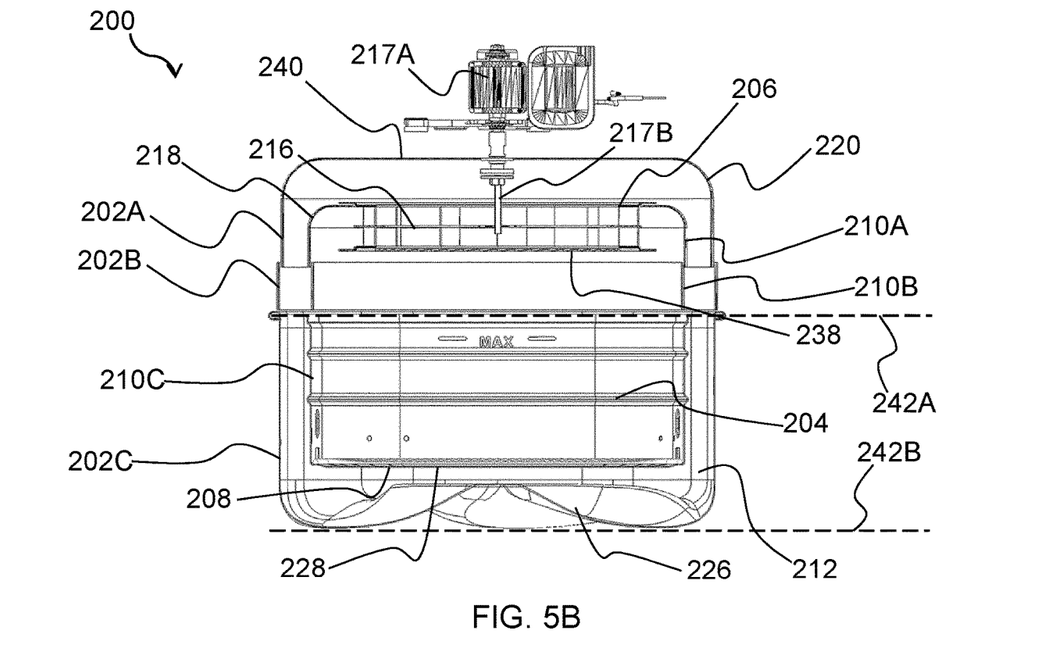
FIG. 5B shows the air fryer shown in FIG. 5A in a second configuration.

FIG. 5A shows a cut-away view of an air fryer 200 according to another example. FIG. 5A shows the air fryer 200 in the first configuration, while FIG. 5B shows the air fryer 200 in the second configuration. The air fryer 200 shown in FIGS. 5A and 5B comprises the features described above in relation to the exemplary air fryer 200 shown in FIGS. 1A and 1B, although the heater 214 is not shown in FIGS. 5A and 5B for the sake of clarity.

The exemplary air fryer 200 shown in FIGS. 5A and 5B comprises a shielding member 238. The shielding member 238 may, for example, take the form of a plate formed from a metal or metal alloy, e.g. steel. The plate is preferably formed from galvanized sheet metal.

As shown in FIG. 5B, the shielding member 238 at least partially blocks air from axially entering the fan 216 in the direction of the first opening 206 from the inner cooking chamber 204 in the second configuration. This facilitates the desired flow direction in the second configuration, as represented by the arrows in FIGS. 1B and 2B, because the shielding member 238 inhibits or prevents air being axially drawn through the inner cooking chamber 204 by the fan 216 in the direction of the first opening 206. The shielding member 238 may provide an advantageously simple and inexpensive way of assisting the airflow direction switch upon adoption of the second configuration.

The fan 216 may, for example, be axially movable relative to the shielding member 238, such that the shielding member 238 at least partially blocks air from axially entering the fan 216 from the inner cooking chamber 204 in the second configuration, but does not block air from axially entering the fan 216 in the first configuration.

In the case of the axially expanding inner cooking chamber 204 and cooking chamber, as shown in FIGS. 5A and 5B, the shielding member 238 may be axially moveable together with the first wall section 210A and the first cooking chamber part 202A, whilst the axial position of the fan 216 remains fixed. Thus, the shielding member 238 may only block the respective side of the fan 216 when the inner cooking chamber 204 is axially expanded.

In the case of the telescopically mounted fan 216, as in the example shown in FIGS. 2A and 2B, the axial position of the shielding member 238 may be fixed, but axial extension of the fan 216 in the second configuration may bring the respective side of the fan 216 (facing the chamber 204) into abutment with the fixed shielding member 238, thereby enabling the shielding member 238 to block axial airflow into the respective side of the fan 216.

In an embodiment, the fan 216 may be arranged relative to the cooking chamber in the first configuration such that the cooking chamber at least partially blocks air from axially entering the fan 216 towards the first opening 206 from the duct 212. This may assist in promoting the desired airflow in the first configuration, since the close proximity between the fan 216 and the cooking chamber in the first configuration may assist to minimize or prevent that air is axially drawn into the fan 216 towards the first opening 206 from the duct 212. Relative axial movement of the fan 216 when adopting the second configuration may effectively move the fan 216 away from the shielding portion 240. Accordingly, the shielding portion 240 may not prevent air from being axially drawn from the duct 212 into the inner cooking chamber 204 via the first opening 206 in the second configuration.

The shielding portion 240 of the first wall which blocks axial air passage from the duct 212 into the fan 216 may, for instance, be integral to the rest of the first wall 202. In the non-limiting example shown in FIGS. 5A and 5B, the shielding portion 240 is integral to the first cooking chamber part 202A. In alternative examples, the shielding portion 240 is included in a further shielding member (not shown) mounted in the duct 212.

Figure 6A:
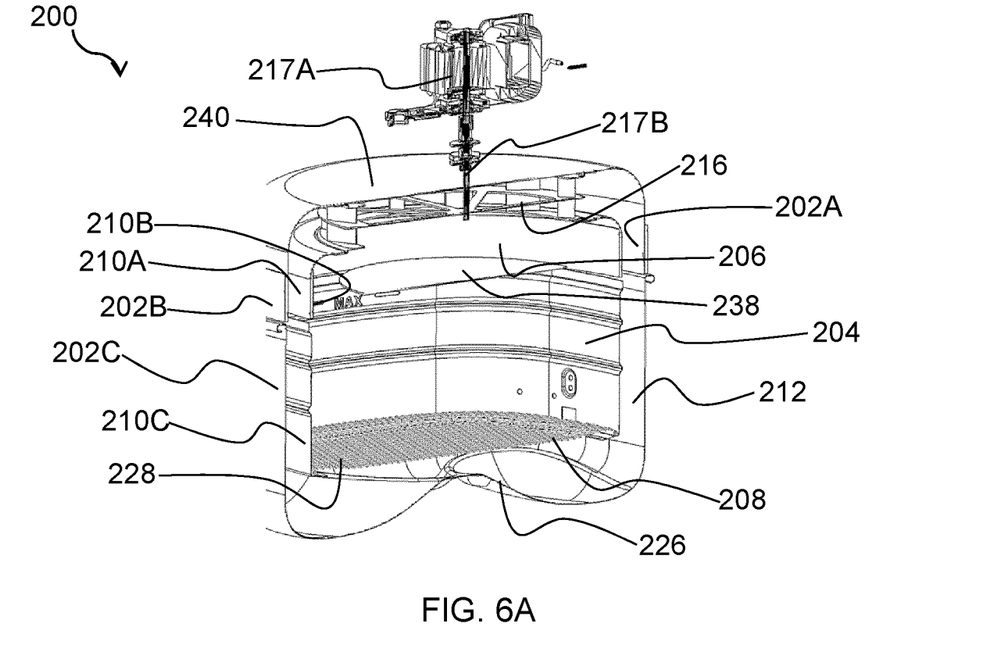
FIG. 6A shows a cut-away perspective view of the air fryer in the first configuration shown in FIG. 5A.
Figure 6B:
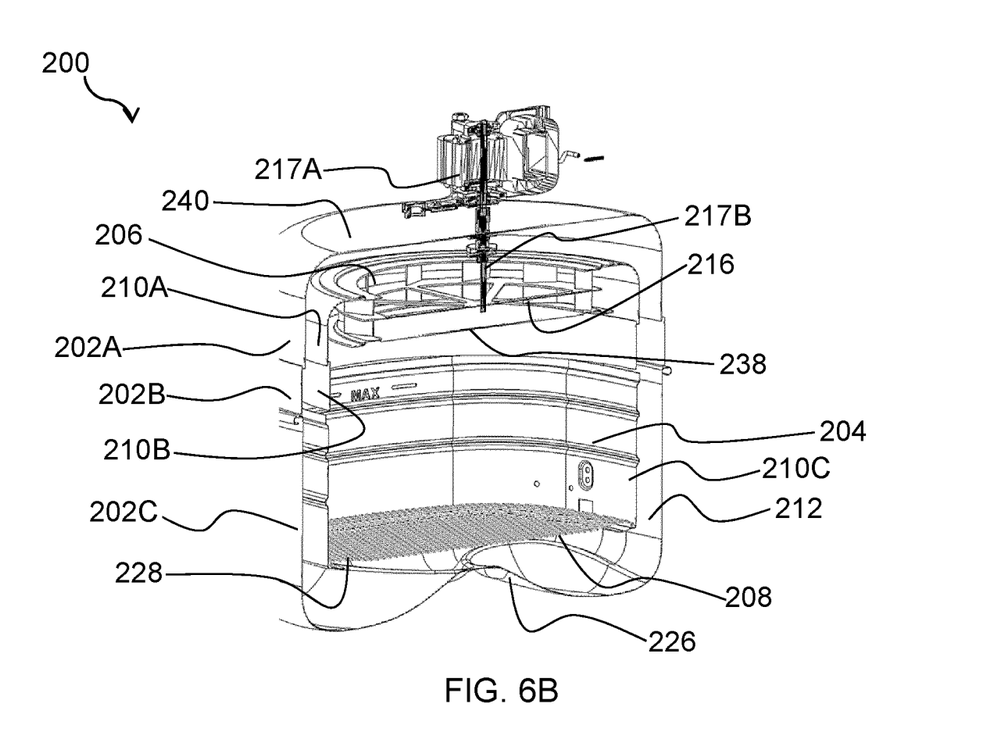
FIG. 6B shows a cut-away perspective view of the air fryer in the second configuration shown in FIG. 5B.

FIGS. 6A and 6B respectively show cut-away perspective views of the air fryer 200 in the first configuration shown in FIG. 5A and the second configuration shown in FIG. 5B. As shown in FIGS. 6A and 6B, the shielding member 238 may have an area which is at least as large as the open area of the fan 216, thereby to permit the shielding member 238 to provide effective blocking of the respective side of the fan 216 in the second configuration.

As shown in FIGS. 5A, 5B, 6A and 6B, the first wall 202 comprises a third cooking chamber part 202C, and the second wall 210 comprises a third wall section 210C. The third cooking chamber part 202C and the third wall section 210C define a drawer which is laterally slidable relative to the first and second cooking chamber parts 202A, 202B, and the first and second wall sections 210A, 210B. The first and second cooking chamber parts 202A, 202B and the first and second wall sections 210A, 210B are mounted so as not to move laterally with the drawer.

A connecting part may, for example, be positioned between the third cooking chamber part 202C and the first and second cooking chamber parts 202A, 202B, and between the third wall section 210C and the first and second wall sections 210A, 210B. The connecting part may permit the drawer to laterally slide whilst the lateral positions of first and second wall sections 210A, 210B, and the first and second cooking chamber parts 202A, 202B remain fixed. Moreover, the connecting part may enable axial expansion of the cooking chamber and the inner cooking chamber 204, whilst leaving the axial positions of the third cooking chamber part 202C and the third housing section 210C fixed.

In the depicted example, the perforate wall 228 is included in the third wall section 210C, and the air guide member 226 is included in the third cooking chamber part 202C. Accordingly, sliding removal of the drawer may permit the perforate wall 228 and the air guide member 226 to be removed. The removable drawer may thus assist to facilitate cleaning of these components, as well as enabling food to be placed into or removed from the third cooking chamber part 202C.

The air fryer 200 may comprise a housing (not visible) in which the cooking chamber is received. In such an embodiment, the above-described drawer (when such a drawer is included in the air fryer) may be slidable into and out of the housing.

Figure 7:
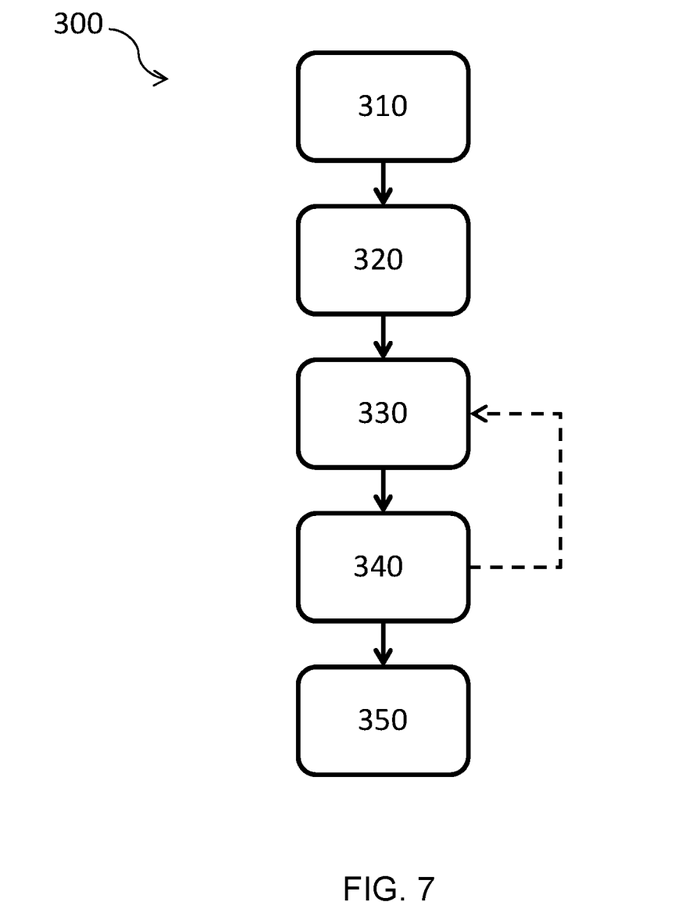
FIG. 7 shows a flowchart of a method according to an example.

FIG. 7 shows a flowchart of a method 300 according to an example. The method 300 commences in step 310. Step 310 may, in certain embodiments, be regarded as the step of providing an air fryer comprising: a cooking chamber; an inner cooking chamber within the cooking chamber, the inner cooking chamber having a first opening and a second opening opposing the first opening, and a second wall extending between the first opening and the second opening; a duct defined by a space between the cooking chamber and the second wall, the duct providing a fluid connection between the first opening and the second opening; a heater for heating the inner cooking chamber; and a fan for receiving air from axial directions and moving the air radially. In other words, step 310 may, for instance, comprise providing the air fryer 200 as described above.

In step 320, food received in the inner cooking chamber of the air fryer is cooked. Step 320 may be implemented with the air fryer in either the first or the second configuration described above.

The method 300 further comprises the step 330 of axially moving the fan relative to the inner cooking chamber between the first configuration and the second configuration, thereby to reverse the direction of airflow, as previously described. When the cooking step 320 comprises cooking the food with the air fryer in the first configuration, step 330 may comprise switching to the second configuration. On the other hand, when the cooking step 320 comprises cooking the food with the air fryer in the second configuration, step 330 may comprise switching to the first configuration.

In step 340, the food is then cooked in the configuration adopted following step 330. The hashed arrow in FIG. 7 represents a loop whereby the food is cooked with the air fryer in one of the respective configurations in step 340, the configuration is changed in step 330, and the food is cooked in the other of the respective configurations in step 340, and so on. The method 300 ends in step 350.

By changing from the first configuration to the second configuration (and vice versa) during cooking, more homogeneous cooking, baking or frying may be achieved relative to, for example, cooking using a single air fryer configuration or airflow direction. Moreover, axially moving the fan relative to the inner cooking chamber may mean that changing the airflow direction is implemented in a relatively straightforward and robust manner.

The method 300 may, for example, be implemented automatically by a processor included in the air fryer 200. The processor may, for example, send control signals to mechanisms configured to control the configuration adopted by the air fryer 200 in step 330. For example, the mechanisms may control the axial expansion/collapsing of the inner cooking chamber 204, and optionally the cooking chamber, as described above in relation to FIGS. 1A, 1B, 5A, 5B, 6A and 6B. Alternatively, such mechanisms may control the telescopically mounted fan 216, as described above in relation to FIGS. 2A and 2B.

The processor may further control the heating element 214 and the fan 216 in order to implement the cooking steps 320 and 340. The processor may thus implement the method 300 in order to homogeneously cook, bake or fry food.

The air fryer 200 may, for instance, include a suitable user interface, such as a touch screen, push buttons, a dial, etc., for enabling the user to select the desired configuration of the air fryer 200 and/or the number of configuration switches (step 330) during the cooking process. Alternatively or additionally, the user interface may enable the user to input cooking parameters, such as temperature.

More generally, the air fryer 200 and method 300 of operation according to the present disclosure enables simple, robust and efficient reversal of the airflow direction in order to improve the homogeneity of cooking, baking or frying. This airflow direction reversal is advantageously achieved without, for example, the requirement for detachable mounting of the various components of the air fryer 200, e.g. the heater 214, the fan 216, and the air guide member 226. Moving such components during the cooking cycle may also be precluded by their relatively high temperature.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. An air fryer comprising:
a cooking chamber delimited by a first wall;
an inner cooking chamber within the cooking chamber, the inner cooking chamber has a first opening and a second opening spaced apart from the first opening, and a second wall extending between the first opening and the second opening;

a duct defined by a space between the first wall and the second wall, the duct providing a fluid connection between the first opening and the second opening;

a heater to heat the inner cooking chamber; and a fan to receive air from axial directions and move the air radially, wherein the fan is axially movable relative to the inner cooking chamber such that the air fryer is configurable to adopt:

a first configuration in which the fan is positioned in the duct and arranged to axially receive air from the inner cooking chamber via the first opening and move the air radially towards the first wall, the first wall being arranged to guide the air to the second opening via the duct; and a second configuration in which the fan is positioned in the inner cooking chamber and arranged to axially receive air from the duct via the first opening and move the air radially towards the second wall, the second wall being arranged to guide the air into the duct via the second opening.

2. The air fryer according to claim 1, further comprising a shielding member arranged to block air from axially entering the fan in the direction of the first opening from the inner cooking chamber in the second configuration.

3. The air fryer according to claim 1, wherein the fan is arranged relative to the cooking chamber in the first configuration such that the first wall blocks air from axially entering the fan in the direction of the first opening from the duct.

4. The air fryer according to claim 1, wherein the inner cooking chamber is axially expandable without changing an axial position of the fan, and wherein an axial expansion of the inner cooking chamber causes the air fryer to change from the first configuration to the second configuration.

5. The air fryer according to claim 4, wherein the second wall comprises a pair of wall sections which at least partially overlap with each other when the air fryer is in the first configuration, the wall sections being axially slidable relative to each other such as to permit said axial expansion of the inner cooking chamber.

6. The air fryer according to claim 5, wherein at least one of the wall sections comprises a heat reflector, or wherein the heat reflector is arranged to guide the air into the duct via the second opening (208) in said second configuration.

7. The air fryer according to claim 4, wherein the cooking chamber is arranged to axially expand with said axial expansion of the inner cooking chamber.

8. The air fryer according to claim 7, wherein the first wall comprises a pair of cooking chamber parts, the cooking chamber parts at least partially overlapping with each other when the cooking chamber is not expanded, and wherein the cooking chamber parts are axially slidable relative to each other such as to permit said axial expansion of the cooking chamber.

9. The air fryer according to claim 8, wherein at least one of said cooking chamber parts comprises a heat shield, or wherein the heat shield is arranged to guide the air to the second opening via the duct in said first configuration.

10. The air fryer according to claim 8, wherein the pair of cooking chamber parts comprises a first cooking chamber part, and the pair of wall sections comprises a first wall section, and wherein the first cooking chamber part is coupled to the first wall section such that sliding of the first cooking chamber part, together with the first wall section, axially expands the inner cooking chamber and the cooking chamber.

11. The air fryer according to claim 10, wherein the first wall comprises a third cooking chamber part, and the second wall comprises a third wall section, wherein the third cooking chamber part and the third wall section define a drawer which is laterally slidable relative to the pair of cooking chamber parts, and the pair of wall sections, and wherein said lateral sliding of the drawer is perpendicular to said axial direction.

12. The air fryer according to claim 11, further comprising a housing in which the cooking chamber is received, wherein the drawer is slidable into and out of the housing.

13. The air fryer according to claim 1, wherein the fan is telescopically mounted such as to permit axial movement of the fan independently of the inner cooking chamber, thereby to permit adoption of the first configuration and the second configuration.

14. The air fryer according to claim 1, further comprising an air guide member in the duct, the air guide member being configured to guide air from the duct into the second opening in the first configuration; or wherein the air guide member is configured to guide air from the second opening into the duct in the second configuration.

15. The air fryer according to claim 1, wherein the second opening is partly defined by apertures of a perforate wall, wherein the perforate wall defines a platform on which foodstuff is placed.

16. A method of operating an air fryer, the air fryer comprising:

a cooking chamber delimited by a first wall;

an inner cooking chamber within the cooking chamber, the inner cooking chamber having a first opening and a second opening spaced apart from the first opening, and a second wall extending between the first opening and the second opening;

a duct defined by a space between the cooking chamber and the second wall, the duct providing a fluid connection between the first opening and the second opening;

a heater for heating the inner cooking chamber; and a fan for receiving air from axial directions and moving the air radially, wherein the method comprises:

axially moving the fan relative to the inner cooking chamber between:

a first configuration in which the fan is positioned in the duct and axially receives air from the inner cooking chamber via the first opening and moves the air radially towards the first wall, the first wall guiding the air to the second opening via the duct; and a second configuration in which the fan is positioned in the inner cooking chamber and axially receives air from the duct via the first opening and moves the air radially towards the second wall, the second wall guiding the air into the duct via the second opening;

or wherein the method further comprises:

cooking a foodstuff received in said inner cooking chamber in the first configuration; and cooking the foodstuff in the second configuration.

\* \* \* \* \*